US009088090B2

(12) United States Patent
Chin et al.
(10) Patent No.: US 9,088,090 B2
(45) Date of Patent: Jul. 21, 2015

(54) UNIVERSAL PURPOSE POWER ADAPTER

(76) Inventors: Kien Hoe Daniel Chin, Singapore (SG); Gang Feng, Zhejiang (CN)

( * ) Notice: Subject to any disclaimer, the term of this patent is extended or adjusted under 35 U.S.C. 154(b) by 528 days.

(21) Appl. No.: 13/417,109

(22) Filed: Mar. 9, 2012

(65) Prior Publication Data

US 2012/0229079 A1 Sep. 13, 2012

Related U.S. Application Data

(60) Provisional application No. 61/451,547, filed on Mar. 10, 2011.

(51) Int. Cl.

*H01M 10/46* (2006.01)
*H01R 12/51* (2011.01)
*H01R 4/48* (2006.01)

(52) U.S. Cl.

CPC ............ *H01R 12/515* (2013.01); *H01R 4/4818* (2013.01); *Y10T 29/49117* (2015.01)

(58) Field of Classification Search

CPC .............................. H02J 7/0042; H01M 10/46
USPC .......................................................... 320/107
See application file for complete search history.

(56) References Cited

U.S. PATENT DOCUMENTS 5,876,237 A * 3/1999 Patel et al. .................... 439/441
6,137,280 A 10/2000 Ackermann et al.
6,250,950 B1 * 6/2001 Pallai ............................ 439/441
6,428,343 B1 * 8/2002 Landis et al. ................. 439/441
6,604,951 B2 * 8/2003 Liao ............................. 439/76.1
6,774,603 B2 * 8/2004 Liao .............................. 320/107
6,791,298 B2 9/2004 Shenai et al.
7,377,805 B2 * 5/2008 Kim et al. ..................... 439/502
7,597,570 B2 10/2009 So
7,646,107 B2 1/2010 Smith
7,839,119 B2 * 11/2010 Onose ........................... 320/113
7,893,657 B2 2/2011 Chavakula
8,009,451 B2 8/2011 So
8,035,356 B2 10/2011 Mentelos
2007/0238341 A1 10/2007 So
2007/0278996 A1 12/2007 So
2008/0028789 A1 * 2/2008 Prochilo ......................... 62/529
2009/0038673 A1 * 2/2009 Ware ............................. 136/246
2011/0309928 A1 12/2011 Henson et al.
2011/0309934 A1 12/2011 Henson et al.

* cited by examiner

*Primary Examiner* — Samuel Berhanu
*Assistant Examiner* — Jerry D Robbins
(74) *Attorney, Agent, or Firm* — Fish & Tsang LLP

(57) ABSTRACT

A universal purpose power adapter has a first box and a second box, in which the first box includes a first socket, a first plug and first terminal blocks, and the second box further comprises a second plug and second terminal blocks. The second plug couples to the first socket and to the power output port at the same time; the first plug couples to the charging port of the backup battery. A backup battery can be connected to a digital product via the power adaptor. A selector circuit in each of the first and second boxes, and coupled, facilitates power routing through the connected boxes.

13 Claims, 4 Drawing Sheets

UNIVERSAL PURPOSE POWER ADAPTER

TECHNICAL FIELD

The present invention relates to a connecting device for connecting a power supply to digital products, particularly to a universal purpose power adaptor.

BACKGROUND TECHNOLOGY

With the popularization and dissemination of 3G and 4G LTE technologies, portable digital products such as laptops, tablet PCs, mobile phones, etc. have become indispensable in people's daily work and life. As a result, demands for portable backup batteries are ever growing. Due to the inability to mate power ports among different digital products, however, backup battery manufactures have to prepare different types or sorts of power sockets to match a user's specific product. This factor can cause high manufacturing costs and may limit the wide utilization of backup batteries.

SUMMARY

To solve the above-mentioned shortcomings in the art, the embodiments provide a universal purpose power adaptor, having first and second boxes. The first box includes a first socket, a first plug and a first terminal block, in which the first terminal block has a first power input and a first power output, and in which the first power input and output have respective first grounding terminals. The second box includes a second plug and a second terminal block, in which the second terminal block has a second power input and a second power output, and in which the second power input and output have respective second grounding terminals. The second plug couples into the first socket, where a power output port of a backup battery and the first plug couples to the charging port of the backup battery. First and second boxes also may be used independently.

Each of the first and second terminal blocks includes a shell with a guiding hole opened therethrough; a moving block within the shell having a fixing slot opened therethrough; a spring strip coupled to the moving block; a metal strip with pins coupled to the spring strip, in which the metal strip is fixed in the shell and wherein the spring strip is coupled to the metal strip, and a fixing block integrated on the spring strip and protruding into the fixing slot, in which each terminal block has a power side and a ground side.

The first and second boxes respectively house, in the first box, a first LED indicator having a first anode and a first cathode; and a first selector circuit; and, in the second box, a second LED indicator having a second anode and a second cathode; and a second selector circuit. In the first box, the first socket, the first plug, the first terminal block, and the first LED indicator are respectively connected to the first selector circuit and, in the second box, the second plug, the second terminal block, and the second LED indicator are respectively connected to the second selector circuit.

The first selector circuit includes first, second, and third resistors with first and second MOS transistors. The second selector circuit includes third, fourth, and fifth resistors with third and fourth MOS transistors. In the first selector circuit, the first resistor R1 has a first resistor end and a second resistor end; a second resistor R2 has a third resistor end and a fourth resistor end; a third resistor R3 has a fifth resistor end and a sixth resistor end, coupled to with first and second MOS transistors.

The first MOS transistor Q1 has a first source electrode, a first gate electrode, and a first drain electrode, in which a first power input Vin is coupled through the first terminal block power side and is coupled to the first drain electrode, and in which the power input ground side is coupled to ground. The second MOS transistor Q2 has a second source electrode, second gate electrode, and second drain electrode, in which the first gate electrode is connected to the second drain electrode. The first resistor end of R1 and the third resistor end of R2 are coupled to the first drain electrode, the second resistor end of R1 is coupled to the second gate electrode, the fourth resistor end of R2 is coupled to the first gate electrode, the fifth resistor end of R3 is coupled to the first source electrode, the sixth resistor end of R3 is coupled to the first anode of the first LED indicator 4, and the first cathode of the first LED indicator 4 is coupled to ground. The first source electrode is coupled to the first power output Vout having a grounding terminal coupled to ground, and a first plug and a first socket are respectively connected to the first power output.

The second selector circuit includes a fourth R4, fifth R5, and sixth resistor R6 and third Q3 and fourth Q4 MOS transistors. The fourth resistor R4 has a seventh resistor end and an eighth resistor end, the fifth R5 resistor has a ninth resistor end and a tenth resistor end, and the sixth R6 resistor has a eleventh resistor end and an twelfth resistor end. The third MOS transistor Q3 has a third source electrode, a third gate electrode, and a third drain electrode. The second power output is coupled through the second terminal block power side and is coupled to the third drain electrode. The second terminal block ground side is coupled to ground. The fourth MOS transistor Q4 has a fourth source electrode, a fourth gate electrode, and a fourth drain electrode. The second power input Vin is coupled to the third source electrode. A grounding end of the second power input GND is coupled to ground. The third gate electrode is coupled to the fourth drain electrode, and the fourth source electrode is coupled to ground. The seventh resistor end of R4 and the ninth resistor end of R5 are coupled to the third drain, and the eighth resistor end of R4 is coupled to the fourth gate electrode. The tenth resistor end of R5 is coupled to the third gate electrode, the eleventh resistor end of R6 is coupled to the third source electrode, and the twelfth resistor end of R6 is coupled to the second anode of the second LED indicator 8 and the second cathode of the second LED indicator 8 is coupled to ground. A second power output Vout is coupled to the third drain electrode and coupled to the second terminal block, and the grounding end of the second power output GND is grounded via the second terminal block.

In the universal power adaptor, the first box includes a first box body, a first box cover substantially fixed to the first box body where a first terminal block goes through the first box cover, and a first terminal protecting cover provided on top of the first terminal block. The first box also includes a horizontal insert-buckle generally integrated on one end of the first terminal protecting cover, in which a corresponding accommodating hole is opened on the first box cover, and in which the insert-buckle and the accommodating hole are connected to each other. A press-buckle is integrated on the bottom of the other end of the terminal protecting cover, and a buckling block generally integrated on the first box cover wherein the buckling block presses on the press-buckle. The second box also includes a second box body, a second box cover substantially fixed to the second box body, and a second terminal protecting cover. The second terminal block goes through the second box cover and provided on top of the second terminal block. In general, the first plug and the second plug are the same DC plugs; and the first socket is of DC type couplable to the DC plug.

In contrast with the prior art, a backup battery can be connected to digital products via the power adaptor of the present embodiments simply by using a socket on the backup battery, which matches up with the plug on the power adaptor. Thus, the manufacturers of backup batteries no longer need to prepare different types of plugs and will save costs. Moreover, since the power adapter of the present invention is connected to the originally provided adaptor of a digital product, the backup battery is universally applicable to any digital products and can become popular by itself.

BRIEF DESCRIPTION OF THE DRAWINGS

The invention is generally shown by way of reference to the accompanying drawings in which.

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

DESCRIPTION OF THE EMBODIMENTS

Figure 1:
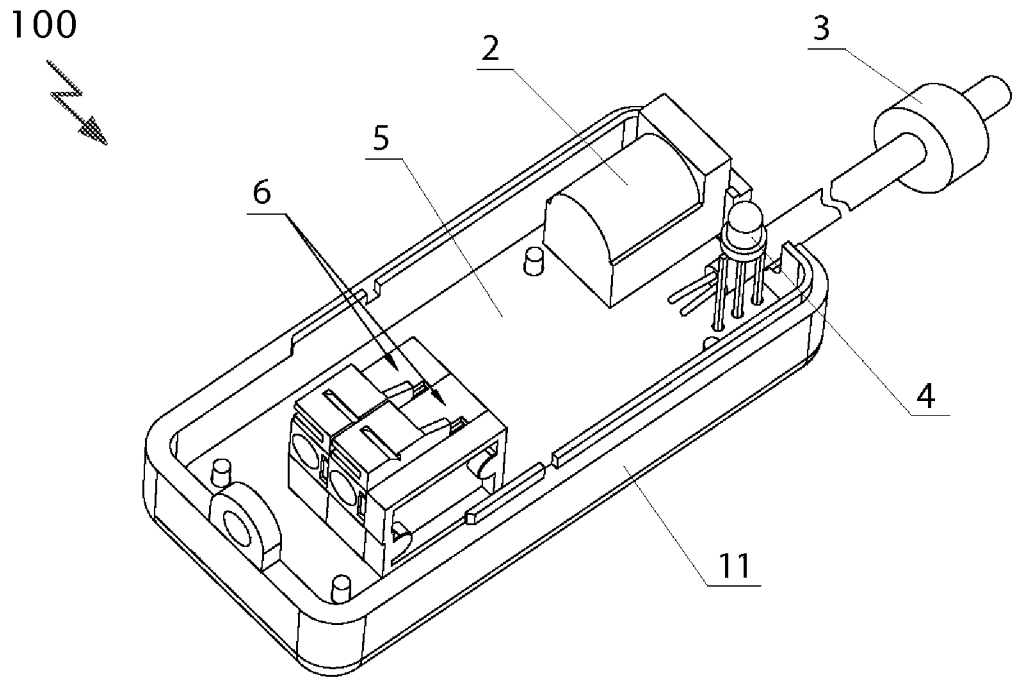
FIG. 1 is a perspective view of the inside bottom of a first adaptor box, according to the present invention.
Figure 2:
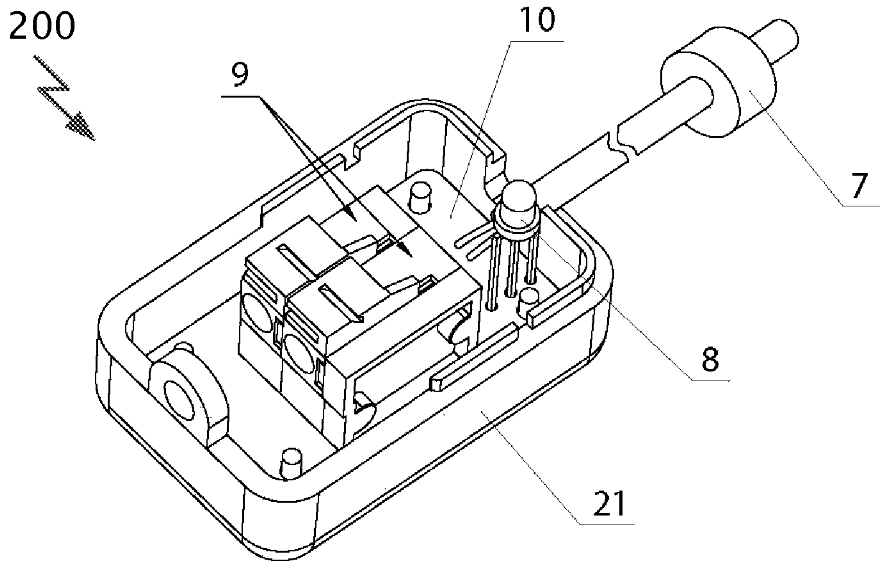
FIG. 2 is a perspective view of the inside bottom of a second adaptor box, according to the present invention.
Figure 3:
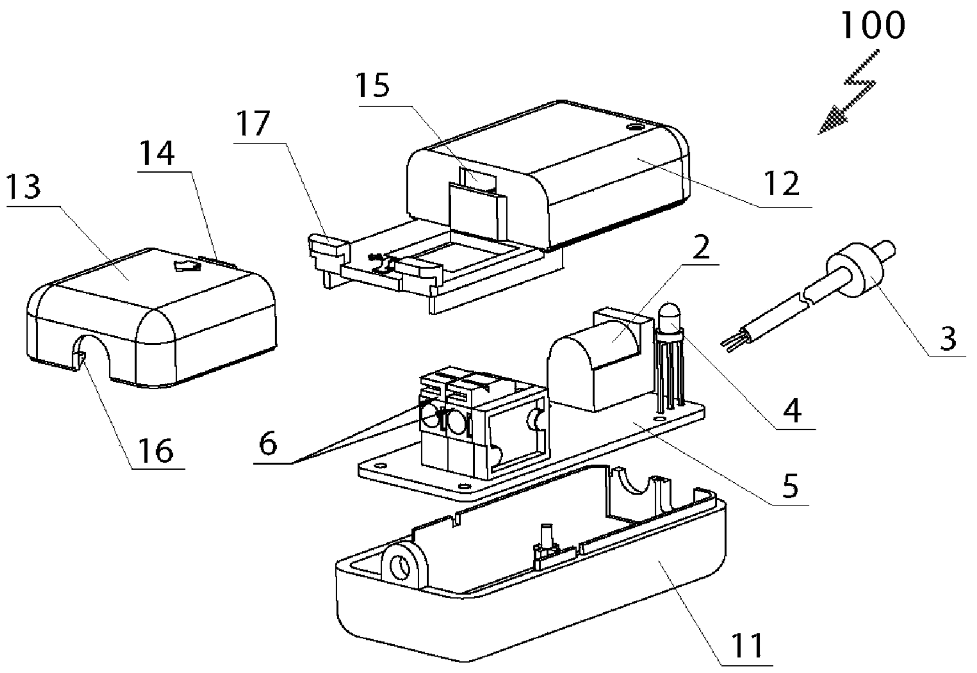
FIG. 3 is an exploded view of the first adaptor box, according to the present invention.
Figure 4:
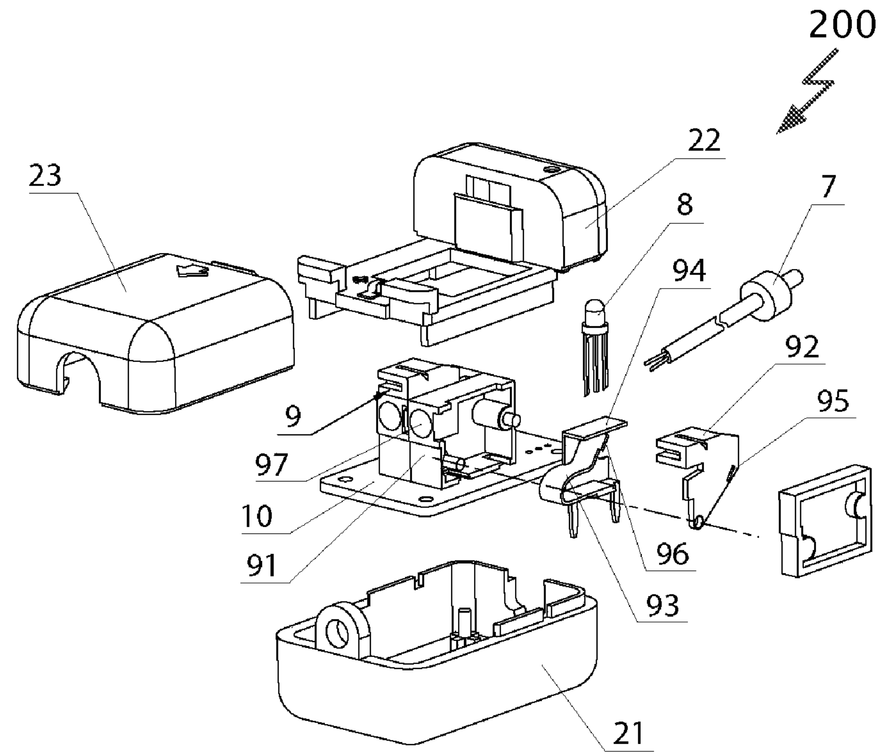
FIG. 4 is an exploded view of the second adaptor box, according to the present invention.

A universal purpose power adaptor in accordance with the present embodiments can include a first box 100 (FIGS. 1 and 3) and a second box 200 (FIGS. 2 and 4). Turning to FIGS. 1 and 3, the first box 100 can include a first box body 11, a first box cover 12 and a first terminal protecting cover 13. The first box cover 12 is fixed to the first box body 11. The first body 11 accommodates a first socket 2, a first plug 3, a first LED indicator 4, a first circuit selector 5 and two first terminal blocks 6. The first socket 2, the first plug 3, the first terminal blocks 6 and the first LED indicator 4 are respectively connected to the first circuit selector 5. The first terminal block 6 goes through the first box cover 12. the first terminal protecting cover 13 is designed on top of the first terminal block 6. A horizontal insert-buckle 14 is integrated on one side of the first terminal protecting cover 13 and a corresponding accommodating hole 15 is opened on the first box cover 12. The insert-buckle 14 and the accommodating hole 15 generally are interconnected. A press-buckle 16 is integrated on the bottom of the other end of the terminal protecting cover 13, and a buckling block 17 is integrated on the first box cover 12. Typically, the buckling block 17 presses on the press-buckle 16.

Turning to FIGS. 2 and 4, the second box 200 can include a second box body 21, a second box cover 22 and a second terminal protecting cover 23. The second box cover 22 is fixed to the second box body 21. The second body 21 accommodates a second plug 7, a second LED indicator 8, a second circuit selector 10 and two second terminal blocks 9. The second plug 7, the second terminal block 9 and the second LED indicator 8 are respectively connected to the second circuit selector 10. The second terminal block 9 goes through the second box cover 22. The second terminal protecting cover 23 is provided on top of the second terminal block 9. The method of connecting the second terminal protecting cover 23 to the second box cover 22 is the same as that of the first terminal protecting cover 13 to the first box cover 12.

Figure 5:
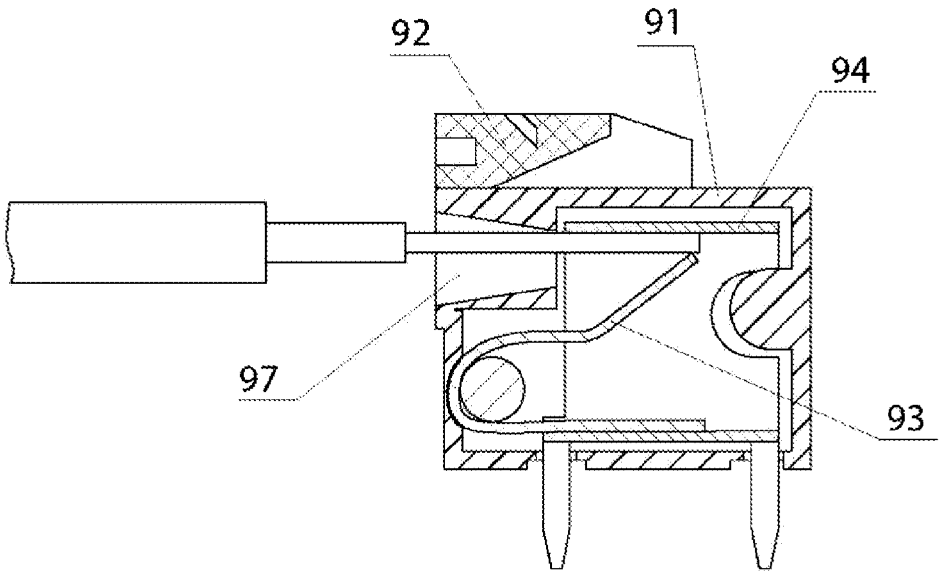
FIG. 5 is a side cutaway view of a terminal block, according to the present invention.

Turning for FIG. 5, the structure of the first terminal block 6 (FIG. 1) is the same as that of the second terminal block 9 (FIG. 2). The second terminal block 9 is created with a shell 91, a moving block 92, a spring strip 93 and a metal strip 94 with pins. The metal strip 94 may be fixed in the shell 91. The spring strip 93 can be furnished to the metal strip 94 with its top touching the metal strip 93. The moving block 92 can be pivotably connected to the shell 91. A fixing slot 95 is opened in the moving block 92. A fixing block 96 is integrated on the spring strip 93 and sticks into the fixing slot 95. A guiding hole 97 is opened in the shell 91.

Figure 8:
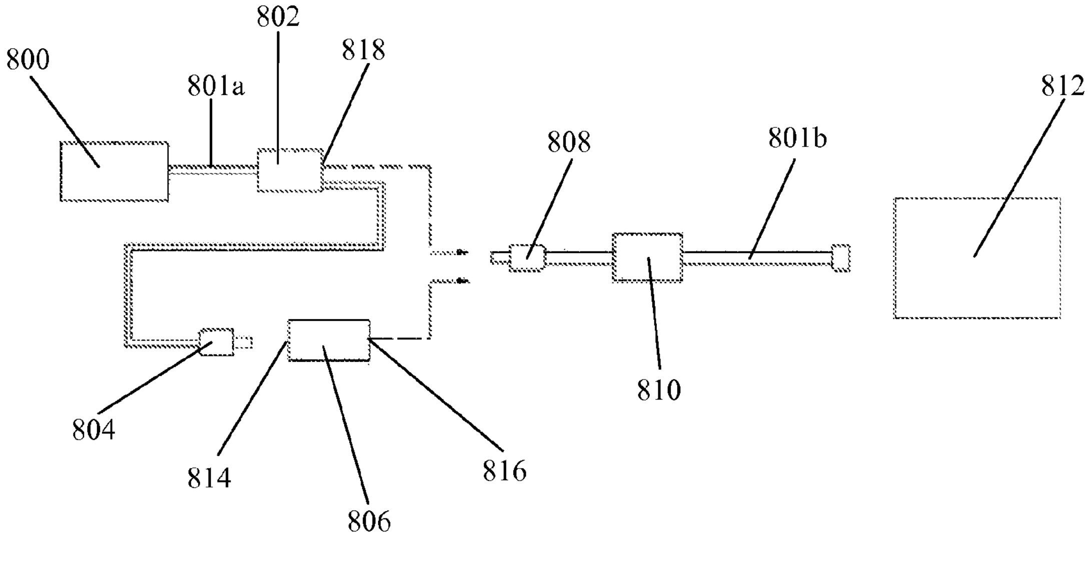
FIG. 8 is an exploded view of the first and second box of the universal power adaptor, according to the present invention.

In FIG. 8, the second plug 7 adapts to the first socket 2 and to the power output port B1 of the backup battery B. The first plug 3 adapts to the charging port B2 of the backup battery B.

Figure 6:
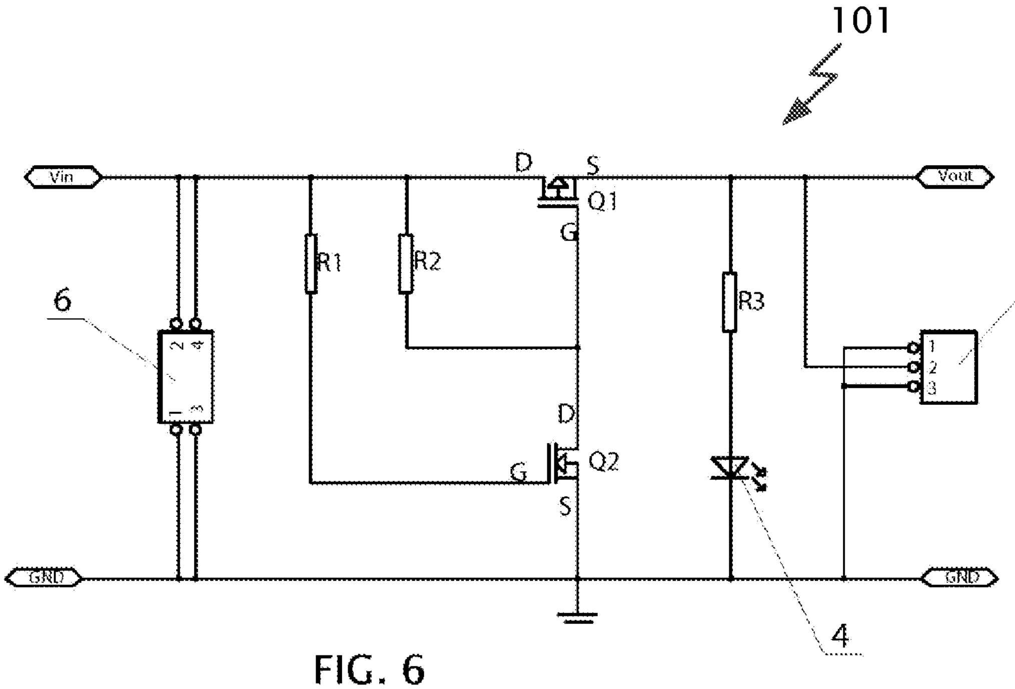
FIG. 6 is a schematic view of a first selector circuit, according to the present invention.

In FIG. 6, the first selector circuit 1O1 of the present embodiment comprises a first MOS transistor Q1, a second MOS transistor Q2, a first resistor R1, a second resistor R2 and a third resistor R3, a first power input which is connected to the first drain electrode D of the first MOS transistor Q1 via the first terminal block 6. First resistor R1 has a first resistor end and a second resistor end. Second resistor R2 has a third resistor end and a fourth resistor end. Third resistor R3 has a fifth resistor end and a sixth resistor end. The grounding terminal GND of the first power input is grounded via the first terminal block 6. The first gate electrode G of the first MOS transistor O1 is connected to the second drain electrode D of the second MOS transistor Q2. The second source electrode S of the second MOS transistor 02 is coupled to ground. First resistor end of the first resistor R1 and third resistor end of the second resistor R2 are both connected to the first drain electrode D of the first MOS transistor Q1. The second resistor end of the first resistor R1 is connected to the second gate electrode G of the second MOS transistor Q2, and the fourth resistor end of the second resistor R2 is connected to the first gate electrode G of the first MOS transistor Q1. The fifth resistor end of the third resistor R3 is connected to the first source electrode S of the first MOS, and the sixth resistor end of the third resistor R3 is connected to the first anode of the first LED indicator 4, With the first cathode of first LED indicator 4 being grounded. The first source electrode of the first MOS transistor O1 is connected to the first power output whose grounding terminal is grounded. The first plug (not shown) and the first socket 2 are respectively connected to the first power output.

Figure 7:
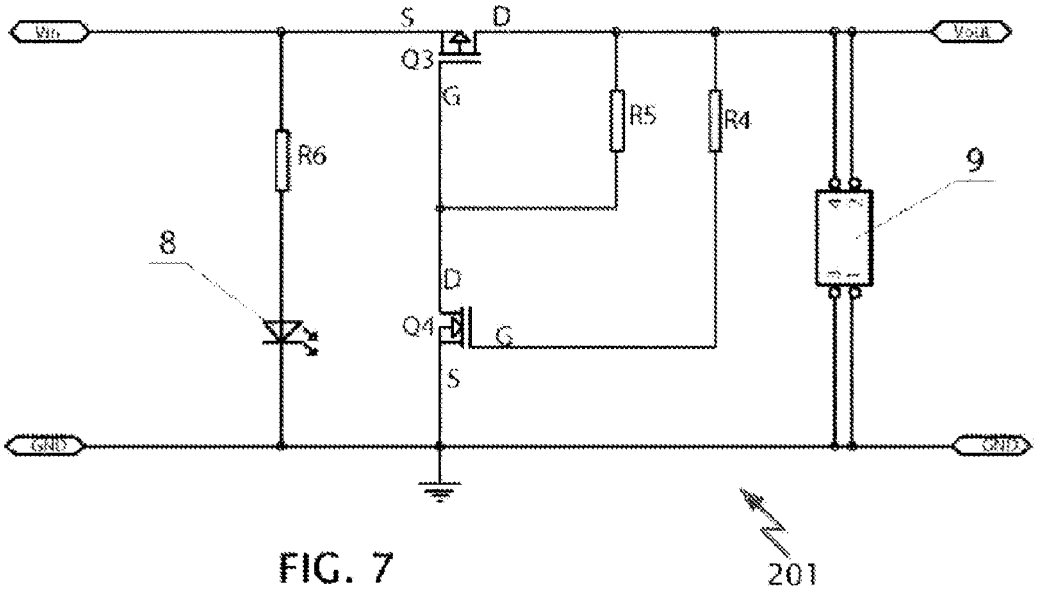
FIG. 7 is a schematic view of a second selector circuit, according to the present invention.

The second selector circuit 2O1, seen in FIG. 7, includes a third MOS transistor Q3, a fourth MOS transistor Q4, a fourth resistor R4, a fifth resistor R5 and a sixth resistor R6. Fourth resistor R4 has a seventh resistor end and an eighth resistor end. Fifth resistor R5 has a ninth resistor end and a tenth resistor end. Sixth resistor R6 has an eleventh resistor end and a twelfth resistor end. A second power input is connected to the third source electrode S of the third MOS transistor Q3. The grounding end of the second power input is grounded. The second plug (not shown) is connected to the second power input. The third gate electrode G of the third MOS transistor 03 is connected to the fourth drain electrode D of the fourth MOS transistor Q4. The fourth source electrode S of the fourth MOS transistor Q4 can be coupled to ground. The seventh resistor end of the fourth resistor R4 and the ninth resistor end of the fifth resistor R5 are both connected to the third drain electrode D of the third MOS transistor Q3. The eighth resistor end of the fourth resistor R4 is connected to the fourth gate electrode G of the fourth MOS transistor Q4 and the tenth resistor end of the fifth resistor R5 is connected to the third gate electrode G of the third MOS transistor Q3. The eleventh resistor end of the sixth resistor R6 is connected to the third source electrode S of the third MOS transistor Q3 and the twelfth resistor end of the sixth resistor R6 is connected to the second anode of the second LED indicator 8. The second cathode of the second LED indicator 8 is coupled to ground. A second power output is connected to the third drain electrode D of the third MOS transistor Q3 via the second terminal block 9. The grounding end of the second power output is grounded via the second terminal block 9.

In the above embodiment, the first plug (not shown) and the second plug (not shown) may be the same and may both be of DC type. The first socket is of DC type that matches a DC plug.

Using FIG. 8 with assistance of FIGS. 1-5, method of assembling a power adaptor embodiment is described below. Begin by cutting the wires 801*a* and 801*b* of an original power connector for an original power adaptor 800 of a digital product 812. The original power connector may be removed and used for the second box 810. By stripping off the insulation layer at the cut end of the adaptor wire's 8O1*a* anode and the cathode by between about 1 cm. to about 2 cms., a useful length of bare wire is exposed. Then, proceed by opening the first terminal protecting cover of the first box 802, and lifting the moving block of the two first terminal blocks in the first box 802. Inserting the respective original adaptor wire's 801*a* anode end and cathode end wires into the guiding holes in the first terminal blocks of the first box 802, according to the anode and the cathode marks shown on the first box cover may follow. Continue by releasing the moving block to fix the two ends of the wire and connecting the power adaptor 800 to utility power supply and watching the status of the first LED indicator (not pictured) in the first box 802: if the first LED indicator is on, it indicates that the connection to the first selector circuit is correct and complete the first box by covering with first terminal protecting cover.

For the second box, method includes cutting and stripping the original power connector wire's 801*b* anode and the original power connector cathode by between about 1 cm. to about 2 cms., a useful length of bare wire is exposed. Inserting the respective original power connector wire's 801*b* anode end and cathode end wires into the guiding holes in the first terminal blocks, according to the anode and the cathode marks shown on the second box cover may follow. Continue by releasing the second moving block to fix the original power connector wire's 801*b* anode end and cathode end wires and connecting the original power connector wire's 801*b* anode end and cathode end wires to second plug 808 via second selector circuit 810. First and second boxes may be coupled or may work independently.

The power adaptor herein when connected to the original power adaptor 800 may have the following three optional functions:

(1) Connecting the first plug 804 of the first box 802 to the charging port 814 of the backup battery 806 and charging the backup battery 806 with the original power adaptor 800. In this way, the backup battery 806 does not need an extra charger. It saves money and is convenient to a user.

(2) Alternatively, connecting the second plug 808 in the second box 810 to the output port 816 of the backup battery 806 and providing power supply to the digital product 812 with the backup battery 806. This function will extend the life length of the original battery provided with the digital product 812 and is a good alternative for trips.

(3) Yet alternatively, connecting the second plug in the second box 810 to the first socket 818 in the first box 802 and using the original power adaptor 800 to provide power supply to the digital product 812.

While the present invention has been particularly shown and described with references to preferred embodiments thereof, it will be understood by those skilled in the art that various changes in form and details may be made therein without departing from the spirit and scope of the invention as defined by the claims. It is clearly understood therefore that the same is by way of illustration and example only and is not to be taken by way of limitation.

What is claimed is:

1. A universal purpose power adaptor, comprising:

a first box having a first socket, a first plug, a first terminal block, a first LED indicator having a first anode and a first cathode; and a first selector circuit, wherein the first socket, the first plug, the first terminal block and the first LED indicator are respectively connected to the first selector circuit;

a second box having a second plug, a second terminal block, a second LED indicator having a second anode and a second cathode; and a second selector circuit, wherein the second plug, the second terminal block and the second LED indicator are respectively connected to the second selector circuit;

wherein the second plug is coupleable to the first socket, wherein the second plug is coupleable to a power output port of a backup battery and the first plug couples to the charging port of the backup battery;

wherein each of the first and second terminal blocks further comprises:

a shell with a guiding hole opened therethrough;

a moving block within the shell having a fixing slot opened therethrough;

a spring strip coupled to the moving block;

a metal strip with pins coupled to the spring strip, wherein the metal strip is fixed in the shell and wherein the spring strip is coupled to the metal strip; and a fixing block integrated on the spring strip and fixing block sticks into the fixing slot, wherein each terminal block has a power side and a ground side;

wherein the first selector circuit further comprises:

a first resistor having a first resistor end and a second resistor end;

a second resistor having a third resistor end and a fourth resistor end; and a third resistor having a fifth resistor end and a sixth resistor end, a first MOS transistor having a first source electrode, a first gate electrode, and a first drain electrode, wherein a first power input is coupled through the first terminal block power side and is coupled to the first drain electrode, and wherein the first terminal block ground side is coupled to ground;

a second MOS transistor having a second source electrode, second gate electrode, and second drain electrode, wherein the first gate electrode is connected to the second drain electrode;

wherein a first resistor end and a third resistor end are coupled to the first drain electrode, wherein the second resistor end is coupled to the second gate electrode, wherein the fourth resistor end is coupled to the first gate electrode, wherein the fifth resistor end is coupled to the first source electrode, wherein the sixth resistor end is coupled to the first anode of the first LED indicator, wherein the first cathode of the first LED indicator is coupled to ground;

wherein the first source electrode is coupled to a first power output having a grounding terminal coupled to ground; and wherein a first plug and a first socket are respectively connected to the first power output.

2. A universal purpose power adaptor, comprising:

a first box having a first socket, a first plug, a first terminal block, a first LED indicator having a first anode and a first cathode; and a first selector circuit, wherein the first socket, the first plug, the first terminal block and the first LED indicator are respectively connected to the first selector circuit;

a second box having a second plug, a second terminal block, a second LED indicator having a second anode and a second cathode; and a second selector circuit, wherein the second plug, the second terminal block and the second LED indicator are respectively connected to the second selector circuit;

wherein the second plug is coupleable to the first socket, wherein the second plug is coupleable to a power output port of a backup battery and the first plug couples to the charging port of the backup battery;

wherein each of the first and second terminal blocks further comprises:

a shell with a guiding hole opened therethrough;

a moving block within the shell having a fixing slot opened therethrough;

a spring strip coupled to the moving block;

a metal strip with pins coupled to the spring strip, wherein the metal strip is fixed in the shell and wherein the spring strip is coupled to the metal strip; and a fixing block integrated on the spring strip and fixing block sticks into the fixing slot, wherein each terminal block has a power side and a ground side;

wherein the second selector circuit comprises:

a fourth resistor having a seventh resistor end and an eighth resistor end;

a fifth resistor having a ninth resistor end and a tenth resistor end;

a sixth resistor having a eleventh resistor end and an twelfth resistor end;

a third MOS transistor having third source electrode, third gate electrode, and third drain electrode, wherein the second power input is coupled to the third source electrode, and wherein a grounding end of the second power input is coupled to ground;

a fourth MOS transistor having fourth source electrode, fourth gate electrode, and fourth drain electrode;

wherein the third gate electrode is coupled to the fourth drain electrode, wherein the fourth source electrode is coupled to ground, wherein the seventh resistor end and the ninth resistor end are coupled to the third drain electrode, wherein the eighth resistor end is coupled to the fourth gate electrode, wherein the tenth resistor end is coupled to the third gate electrode, wherein the eleventh resistor end is coupled to the third source electrode, wherein the twelfth resistor end is coupled to the second anode of the second LED indicator and the second cathode of the second LED indicator is coupled to ground, wherein a second power output is coupled to the third drain electrode and coupled to the second terminal block, and wherein the grounding end of the second power output is grounded via the second terminal block.

3. The universal power adaptor of claim 1, wherein the first box further comprises:

a first box body;

a first box cover substantially fixed to the first box body, and a first terminal block goes through the first box cover;

a first terminal protecting cover provided on top of the first terminal block;

a horizontal insert-buckle generally integrated on one end of the first terminal protecting cover, wherein a corresponding accommodating hole is opened on the first box cover and wherein the insert-buckle and the accommodating hole are connected to each other;

a press-buckle is integrated on the bottom of the other end of the terminal protecting cover, and a buckling block generally integrated on the first box cover wherein the buckling block presses on the press-buckle, and wherein the second box further comprises:

a second box body;

a second box cover substantially fixed to the second box body; and a second terminal protecting cover;

the second terminal block goes through the second box cover and provided on top of the second terminal block.

4. The universal purpose power adaptor of claim 1, wherein the first plug and the second plug are the same DC plugs; and the first socket is of DC type coupleable to the DC plug.

5. The universal power adaptor of claim 1, wherein the second selector circuit further comprises:

a fourth resistor having a seventh resistor end and an eighth resistor end;

a fifth resistor having a ninth resistor end and a tenth resistor end;

a sixth resistor having a eleventh resistor end and an twelfth resistor end;

a third MOS transistor having third source electrode, third gate electrode, and third drain electrode, wherein the second power output is coupled to the third drain electrode and coupled through the second terminal block power side, and wherein the second terminal block ground side is coupled to ground;

a fourth MOS transistor having fourth source electrode, fourth gate electrode, and fourth drain electrode;

wherein the second power input is coupled to the third source electrode, wherein a grounding end of the second power input is coupled to ground, wherein the third gate electrode is coupled to the fourth drain electrode, wherein the fourth source electrode is coupled to ground, wherein the seventh resistor end and the ninth resistor end are coupled to the third drain, wherein the eighth resistor end is coupled to the fourth gate electrode, wherein the tenth resistor end is coupled to the third gate electrode, wherein the eleventh resistor end is coupled to the third source electrode, wherein the twelfth resistor end is coupled to the second anode of the second LED indicator and the second cathode of the second LED indicator is coupled to ground, wherein a second power output is coupled to the third drain electrode and coupled to the second terminal block, and wherein the grounding end of the second power output is grounded via the second terminal block.

6. The universal power adaptor of claim 5, wherein the first box further comprises:

a first box body;

a first box cover substantially fixed to the first box body, and a first terminal block goes through the first box cover;

a first terminal protecting cover provided on top of the first terminal block;

a horizontal insert-buckle generally integrated on one end of the first terminal protecting cover, wherein a corresponding accommodating hole is opened on the first box cover and wherein the insert-buckle and the accommodating hole are connected to each other;

a press-buckle is integrated on the bottom of the other end of the terminal protecting cover, and a buckling block generally integrated on the first box cover wherein the buckling block presses on the press-buckle, and wherein the second box further comprises:

a second box body;

a second box cover substantially fixed to the second box body; and a second terminal protecting cover;

the second terminal block goes through the second box cover and provided on top of the second terminal block.

7. The universal power adaptor of claim 6, wherein the first plug of the first box is connect to a charging port of the backup battery and wherein the backup battery is charged with an original power adaptor.

8. The universal power adaptor of claim 6, wherein the second plug in the second box is connected to the output port of a backup battery, and wherein a power supply is provided to a digital product with the backup battery.

9. The universal power adaptor of claim 6, wherein the second plug in the second box is connected to the first socket in the first box and an original power adaptor to provide power supply to a digital product.

10. A universal purpose power adaptor kit, comprising:

a first box and a second box respectively enclosing a first selector circuit; and a second selector circuit;

wherein the first selector circuit comprises:

a first resistor having a first resistor end and a second resistor end;

a second resistor having a third resistor end and a fourth resistor end; and a third resistor having a fifth resistor end and a sixth resistor end, a first MOS transistor having a first source electrode, a first gate electrode, and a first drain electrode, wherein a first power input is coupled through the first terminal block power side and is coupled to the first drain electrode, and wherein the first terminal block ground side is coupled to ground;

a second MOS transistor having a second source electrode, second gate electrode, and second drain electrode, wherein the first gate electrode is connected to the second drain electrode;

wherein a grounding end of the first power input is coupled to ground, wherein a first resistor end and a third resistor end are coupled to the first drain electrode, wherein the second resistor end is coupled to the second gate electrode, wherein the fourth resistor end is coupled to the first gate electrode, wherein the fifth resistor end is coupled to the first source electrode, wherein the sixth resistor end is coupled to the first anode of the first LED indicator, wherein the first cathode of the first LED indicator is coupled to ground;

wherein the first source electrode is coupled to the first power output having a grounding terminal coupled to ground; and wherein a first plug and a first socket are respectively connected to the first power output; and wherein the second selector circuit comprises:

a fourth resistor having a seventh resistor end and an eighth resistor end;

a fifth resistor having a ninth resistor end and a tenth resistor end;

a sixth resistor having a eleventh resistor end and an twelfth resistor end;

a third MOS transistor having third source electrode, third gate electrode, and third drain electrode, wherein the second power output is coupled to the third drain electrode;

a fourth MOS transistor having fourth source electrode, fourth gate electrode, and fourth drain electrode;

wherein the second power input is coupled to the third source electrode, wherein a grounding end of the second power input is coupled to ground, wherein the third gate electrode is coupled to the fourth drain electrode, wherein the fourth source electrode is coupled to ground, wherein the seventh resistor end and the ninth resistor end are coupled to the third drain, wherein the eighth resistor end is coupled to the fourth gate electrode, wherein the tenth resistor end is coupled to the third gate electrode, wherein the eleventh resistor end is coupled to the third source electrode, wherein the twelfth resistor end is coupled to the second anode of the second LED indicator and the second cathode of the second LED indicator is coupled to ground, wherein a second power output is coupled to the third drain electrode and coupled to the second terminal block, and wherein the grounding end of the second power output is grounded via the second terminal block, and wherein the first and second box respectively include in the first box further comprises:

a first box body;

a first box cover substantially fixed to the first box body, and a first terminal block goes through the first box cover;

a first terminal protecting cover provided on top of the first terminal block;

a horizontal insert-buckle generally integrated on one end of the first terminal protecting cover, wherein a corresponding accommodating hole is opened on the first box cover and wherein the insert-buckle and the accommodating hole are connected to each other;

a press-buckle is integrated on the bottom of the other end of the terminal protecting cover, and a buckling block generally integrated on the first box cover wherein the buckling block presses on the press-buckle, and in the second box further comprises:

a second box body;

a second box cover substantially fixed to the second box body; and a second terminal protecting cover;

the second terminal block goes through the second box cover and provided on top of the second terminal block, wherein the first plug and the second plug are the same DC plugs; and the first socket is of DC type coupleable to the DC plug.

11. A method of assembling a power adaptor kit having a first box housing a first selector circuit, comprising:

providing anode and cathode placement marks;

cutting an original power connector wire of a power adaptor of a digital product, producing an adaptor anode wire and an adaptor cathode wire;

stripping off an insulation layer at the cut end of the adaptor anode wire and the adaptor cathode wire by between about 1 cm. to about 2 cms.;

opening a first terminal protecting cover;

lifting a moving block of first terminal blocks in the first box;

inserting the respective adaptor anode wire and adaptor cathode wire into guiding holes in the first terminal blocks, according to the anode and the cathode placement marks;

releasing the moving block to fix the adaptor anode and adaptor cathode ends of the power adaptor wire;

connecting the power adaptor first selector circuit to the utility power supply;

watching the status of a first LED indicator in the first box: if the first LED indicator is lit, the connection generally is correct; and completing the first box by covering with first terminal protecting cover.

12. A method of assembling a power adaptor kit having a second box housing a second selector circuit, comprising:

cutting an original power connector wire of a power adaptor of a digital product, producing a connector anode wire and a connector cathode wire;

stripping off an insulation layer at the cut end of the connector anode wire and the connector cathode wire by between about 1 cm. to about 2 cms.;

opening a second terminal protecting cover;

lifting a moving block of second terminal blocks in the second box;

inserting the respective connector anode wire and connector cathode wire into guiding holes in the second terminal blocks;

releasing the moving block to fix the connector anode and connector cathode ends of the power connector wire;

connecting the original power connector wire to the second selector circuit; and completing the second box by covering with second terminal protecting cover.

13. The method of claim 11, having a second box housing a second selector circuit, comprising:

cutting an original power connector wire of a power adaptor of a digital product, producing a connector anode wire and a connector cathode wire;

stripping off an insulation layer at the cut end of the connector anode wire and the connector cathode wire by between about 1 cm. to about 2 cms.;

opening a second terminal protecting cover;

lifting a moving block of second terminal blocks in the second box;

inserting the respective connector anode wire and connector cathode wire into guiding holes in the second terminal blocks;

releasing the moving block to fix the connector anode and connector cathode ends of the power connector wire;

connecting the original power connector wire to the second selector circuit; and completing the second box by covering with second terminal protecting cover.

* * * * *